(12) United States Patent
Sarangi et al.

(10) Patent No.: US 9,164,662 B2
(45) Date of Patent: Oct. 20, 2015

(54) ANALYSIS AND INFLUENCE OF TRENDS IN ENTERPRISE COLLABORATION FEEDS

(71) Applicants: Chinmaya Sarangi, Sunnyvale, CA (US); Jian Xu, Santa Clara, CA (US); Zhong Zhang, Los Altos, CA (US)

(72) Inventors: Chinmaya Sarangi, Sunnyvale, CA (US); Jian Xu, Santa Clara, CA (US); Zhong Zhang, Los Altos, CA (US)

(73) Assignee: SAP SE, Walldorf (DE)

( * ) Notice: Subject to any disclaimer, the term of this patent is extended or adjusted under 35 U.S.C. 154(b) by 314 days.

(21) Appl. No.: 13/725,783

(22) Filed: Dec. 21, 2012

(65) Prior Publication Data

US 2014/0181679 A1    Jun. 26, 2014

(51) Int. Cl.
*G06F 3/0484* (2013.01)
*G06Q 30/02* (2012.01)
*G06Q 10/10* (2012.01)

(52) U.S. Cl.
CPC ............ *G06F 3/0484* (2013.01); *G06Q 10/101* (2013.01); *G06Q 30/02* (2013.01)

(58) Field of Classification Search
CPC ................................................. G06F 17/30873
USPC ......................................................... 715/738
See application file for complete search history.

(56) References Cited

U.S. PATENT DOCUMENTS

| 7,185,065 | B1 | 2/2007 | Holtzman et al. | |
|---|---|---|---|---|
| 7,702,675 | B1 | 4/2010 | Khosla et al. | |
| 2005/0289147 | A1 | 12/2005 | Kahn et al. | |
| 2007/0022174 | A1 | 1/2007 | Issa | |
| 2011/0112975 | A1* | 5/2011 | McQueen | 705/319 |
| 2012/0131013 | A1* | 5/2012 | Hobbs et al. | 707/748 |
| 2012/0158556 | A1 | 6/2012 | Said et al. | |
| 2013/0024273 | A1* | 1/2013 | Stark et al. | 705/14.43 |

OTHER PUBLICATIONS

Extended European Search Report dated Mar. 13, 2014 for European Patent Application No. 13005117.0.

* cited by examiner

*Primary Examiner* — Andrea Leggett
(74) *Attorney, Agent, or Firm* — Mintz Levin Cohn Ferris Glovsky and Popeo, P.C.

(57) ABSTRACT

Aspects of trending and trend-influencing approaches usable in content feeds of business software frameworks are described. A trending topic can be created based on a plurality of feed content items generated by a plurality of feeds across at least a subset of a customer organization using a business software architecture. The creating can include identifying an activity relating to a business process or scenario of the customer organization that underlies the feed content items. In some options, a super-user can insert artificial trends.

20 Claims, 5 Drawing Sheets

ANALYSIS AND INFLUENCE OF TRENDS IN ENTERPRISE COLLABORATION FEEDS

TECHNICAL FIELD

The subject matter described herein relates to information feeds and trends derived from or used to augment the content of such information feeds.

BACKGROUND

A sales performance application (e.g. SAP Sales OnDemand™ available from SAG AG of Walldorf, Germany, Sales Cloud™ available from Salesforce.com, Inc. of San Francisco, Calif., and the like) can provide a number of functions that support sales activities, collaboration, and the like among sales employees, consultants, managers, and the like (hereinafter referred to as business users) at a customer organization that implements the sales performance application. Some examples of sales performance applications can provide to business users the ability to track information on business objects, instances of business objects, words, other content items, people, and the like that relate to one or more of a specific topic, word, group, etc. Used most broadly, the term business object can refer to any entity represented by a data structure populated by one or more types of data in a database. As used herein, a business object can include a lead, an opportunity, a contact or other person, or other types of contextual or other information that are stored, processed by, or operable upon by users at a customer organization employing a business software architecture (e.g. a sales performance application, an enterprise resource planning architecture, a customer relationship manager solution, or other business software solutions). A business object or other data structure can be a foundation upon which a number of sales force automation or other business software architecture features are based.

A salesperson or other business user (hereinafter generally referred to as a business user) of a sales force automation solution or other business software architecture (hereinafter generally referred to as a business software architecture) can follow an object, for example a business object, and can thereby receive a feed, a news stream, or information delivered as a series of discrete content items via an automatic content delivery approach (hereinafter generally referred to as a feed) that includes updates or other changes to instances of that business object. This functionality can allow a sales person or other business user of the business software architecture to follow other people who are using the business software architecture, projects or opportunities managed by the business software architecture, or the like.

However, unless carefully managed, a feed feature such as is described above can become somewhat overwhelming to a business user, in particular if the business user has subscribed to a significant number of feeds. In such an example, the business user can receive too much information in the form of content items from the subscribed feeds such that the business user's personal feed content stream containing the content items provided by the many subscribed feeds can become confusingly cluttered due to the volume of content items. The term personal feed content stream is used generally herein to refer to a user interface feature in which feed content items from one or more subscribed feeds are presented dynamically as they are received, for example with a newest content item at the top of a stack of received content items.

SUMMARY

The current subject matter can, among other potential advantages, provide beneficial results in allowing the automated and manual creation of trending information that can be presented to business users via a business software architecture user interface to assist business users in better interpreting and prioritizing information provided by the feeds, new streams, and the like.

In one aspect, a method includes displaying, in a feed window of a user interface of a business software architecture, a dynamically updated personal feed content stream and creating a trending topic based on one or more of a plurality of feed content items generated by a plurality of feeds across at least a subset of a customer organization using the business software architecture. The personal feed content stream includes feed content items generated by one or more feeds to which a business user of the business software architecture is subscribed. The creating includes identifying an activity underlying the one or more of the plurality of feed content items. The activity relates to a business process or scenario of the customer organization. The method further includes generating a list of currently trending topics using one or more trending algorithms and displaying the list of trends in a trends window of the user interface that is displayed concurrently with the feed window. The list includes the trending topic.

In some variations one or more of the following can optionally be included in any feasible combination. A method can further include receiving, from a super-user of the customer organization, information relating to an artificial trend item and inserting the artificial trend item into the trends window such that the artificial trend item is visually distinguishable from the list of currently trending topics. The business software architecture can include a sales force automation solution. The generating of the list of currently trending topics can further include accessing, by the one or more trending algorithms, a meta-model of business process or scenario relating to the activity underlying the one or more of the plurality of feed content items, determining, from the meta-model, a definition of at least one business process or scenario relevant to the customer organization, and applying the definition as a further metric in the trending algorithm to generate the list. Alternatively or in addition, the generating of the list of currently trending topics can further include accessing, by the one or more trending algorithms, a meta-model of a business object representing an entity relevant to the business process or business scenario and applying a weighting factor to the feed content item. The business object can generate a feed content item of the plurality of feed content items, and the weighting factor can indicate a level of relevance of the entity to the business process of business scenario extracted from the meta-model of the business object. Alternatively or in addition, the creating further comprises assigning a weight to at least some of the plurality of feed content items, the weight can be based on a business use context of a business object that generates the at least some of the plurality of feed content items.

Implementations of the current subject matter can include, but are not limited to, systems and methods including one or more features as described herein as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
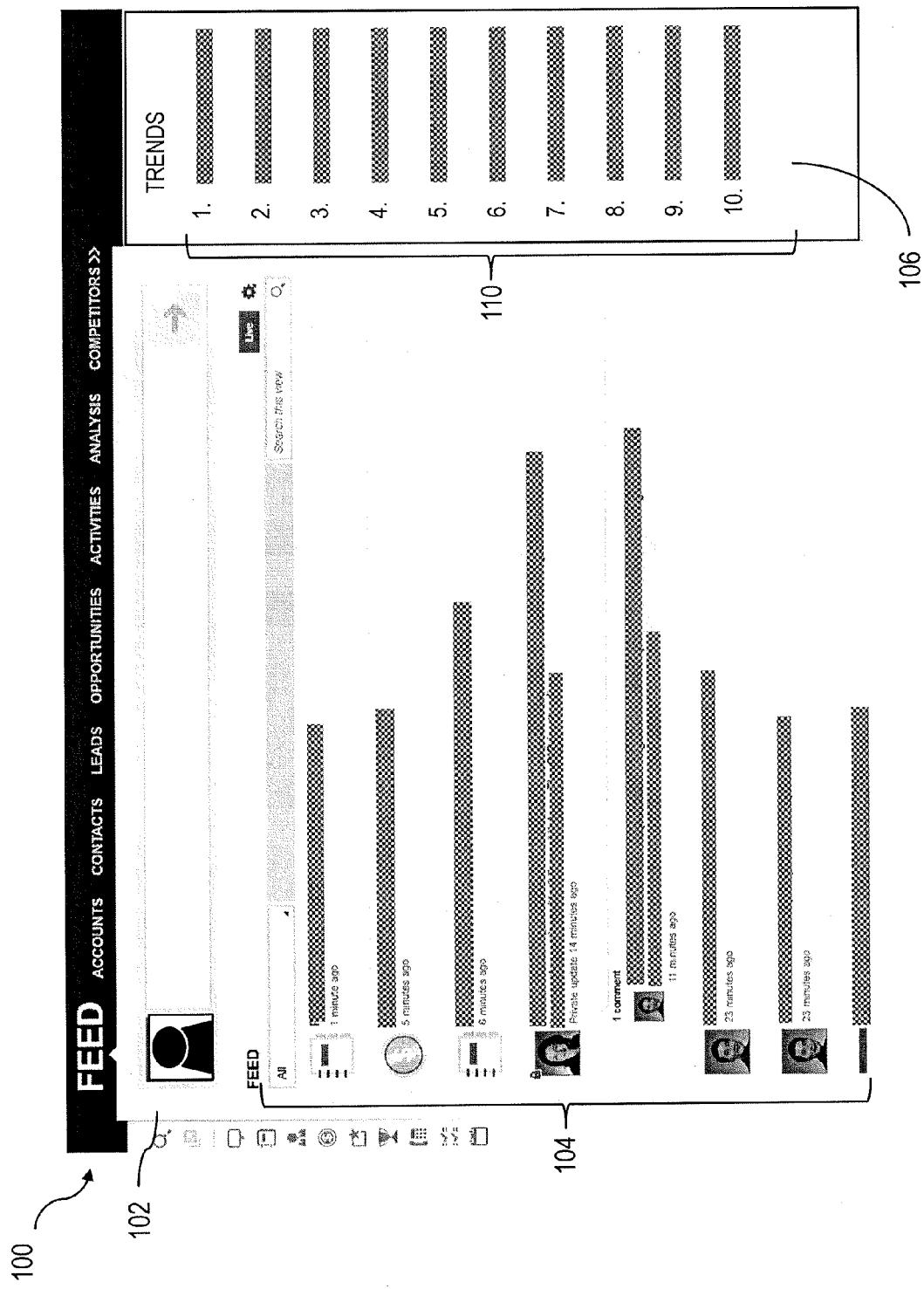
FIG. 1 is a screenshot of a sales flow automation application showing a new feeds panel and a trends panel.

In a competitive sales or business environment, it can be desirable to provide sales people and other business users of a sales performance application or other business software architecture with correct, real-time information in a highly collaborative manner, for example to assist them in executing on their sales or other business goals, benchmarks, or the like. Furthermore, various advantages can be provided by enabling business users within a customer organization to quickly and clearly receive information about current business-related events or milestones, key or "hot" topics, details about new or newsworthy developments, organization needs, and the like. It can also be desirable to allow key decision-makers in an organization to influence the direction of what is needed and also identify certain business relevant commanding trends so that they can preempt future opportunities in a nondirective and seemingly natural way. Using conventional approaches decision makers (e.g. managers, sales team leaders, executives, etc.) generally have little control over the types of information delivered to business users through a feed approach as the feed content items created by each feed are often automatically generated, and the feed content items provided to any given business user are determined based on the feeds to which that business user has subscribed.

As noted above, the large volume of unstructured data typically generated in a business software architecture can make it quite challenging for a sales person or other business user to consume and identify important and relevant trends simply by viewing the content items appearing in his or her personal feed content stream. A business user might therefore miss opportunities to learn about or contribute to key activities that are going on within an organization due to important notices or information appearing in his or her personal feed content stream being drowned in a cluttered stream of feed content.

Implementations of the current subject matter can address such concerns by actively mining the data that is provided to business users via feeds to thereby identify trends that are currently receiving a largest amount of information traffic within the customer organization or one or more subsets of the customer organization (e.g. a department, a division, a working group, a set of business objects, business users, or the like who use or are related to a specific software application or solution, etc.). One or more modeling or other analytical algorithms (hereinafter "trending algorithms) can identify or otherwise determine a ranking of tending content across the customer organization or the one or more subsets. In one example, such a trending algorithm can include one or more of a scoring algorithm, a weighting algorithm, a pattern recognition algorithm, a Fourier algorithm, or other algorithms for extracting trends addressed in the content of a time series of generated content items. A trending algorithm consistent with implementations of the current subject matter can identify trends based on their popularity and importance within a pool of business users at a customer organization (e.g. all or part of a customer organization's sales force, etc.). Trends can be created out of all available feed content items within the pool or subset irrespective of the number of subscribers to any given feed. In this manner, a business user can have access to information from feeds to which the business user had not actually been subscribed.

Trends detected or derived from feed content can, consistent with some implementations of the current subject matter, be displayed concurrently or separately from a user interface panel that displays feed content rather than being directly integrated into the feed content itself.

In other words, additional information extracted from feeds to which a particular business user does not subscribe is not provided inline with the business user's personal feed content stream. Rather, those topics, business objects, etc. which have been highly active as topics or contributors of feed content items across the customer organization or a subset of the customer organization (e.g. within the pool of business users) can be identified as trending content that is highlighted separately from a personal feed content stream of the business user as displayed in a user interface supported by the business software architecture. This aspect is can be better understood with reference to FIG. 1, which shows a screenshot illustrating a first view 100 of a user interface of a business software architecture. In the example of FIG. 1, the business software architecture includes a sales performance application. A feed window (e.g. a tabbed view, a pane, a boxed area, a floating window, or the like on the screen) 102 can display a dynamically updated personal feed content stream showing a series of feed content items 104 generated by one or more feeds to which a business user of the business software architecture is subscribed, registered, etc. On another part of the screen (e.g. a in panel displayed concurrently with and to the right of the feed window 102), a trends window (e.g. a tabbed view, a pane, a boxed area, a floating window, or the like on the screen) 106 can display information about trending topics based on analysis of feed content items currently being generated with a pool of content generators. As noted above, content generators can be business users, business objects or other data structures, or the like [[note: are there any other content generators that should be included?]]. The trending topics can be ranked starting with the "hottest" topic ranked highest in a list of trending topics 110.

A trend tracking function such as can be provided consistent with implementations of the current subject matter can improve information aggregation within feeds and thereby to improve the relevance of the information provided in those feeds. Sales associates and other business users can benefit from a way to stay on top of trending issues and topics, for example so they can gain insight into possible future or upcoming opportunities. Advantages of implementations of the current subject matter can include improved information modeling and identification of trends from the vast amounts of enterprise data created within feeds. Information modeling and identification of trends within one or more of the large pools of structured and unstructured data typically associated with a business software architecture can provide a more accessible view on these data pools to business users who often are juggling multiple projects and demands on their attention. Collaboration between business users can be improved by providing additional layers of intelligent filtering on the information provided to a business user via his or her personal feed content stream. Trends can be exposed to all business users to allow them to remain updated and exchange information within the larger customer organization.

In some examples, each trending topic in the displayed list of trending topics 110 can include a link that navigates to a screen, tab, window, etc. that displays a live feed of feed content items related to the particular trending topic. In this manner, a business user can readily drill down to obtain additional information relating to a trending topic, to make contact with other business users whose activities or interactions with one or more underlying business objects or other data structures are related to the trending topic, etc.

In a modern business software architecture, business data can carry a great deal of context, and can therefore allow intelligent parsing (e.g. between structured and unstructured data) during creation of trends. Unlike public platforms, such as for example Twitter™, Facebook™, or other social media service providers that include the ability of a user to create a news feed based merely on identification of frequently appearing words (e.g. hashtags, etc.) in raw data of various content streams, implementations of the current subject matter include the ability to identify, develop, track, etc. trending topics based on a data context of structured data. Public social media that includes tracking of trends typically uses a metric of user interest in content (e.g. a number of "re-tweets occurring for a given content item) as an input parameter for determining trending topics.

Implementations of the current subject matter can include application of a more evenly applied trending analysis. Trends can be established based on frequency with which certain key words are mentioned, certain business objects are mentioned or accessed or modified, etc. For example, activities related to a specific business object type can create a trending topic around the business process, scenario, etc. supported by that business object type. Trending topics as generated by implementations of the current subject matter can include trends created by frequently appearing words, but other data contexts can also give rise to trending topics. A scoring mechanism consistent with implementations of the current subject matter can efficiently leverage data context because of the ability to read or otherwise access additional information about business users of the business software architecture and also to understand the business scenarios, business processes, etc. of the customer organization using the business software architecture. In some examples, a metamodel of a business object or business process can be accessed by a trending algorithm, and the definitions of business processes, scenarios, etc. relevant to the customer organization can be applied as part of the trending algorithm. Information regarding trending topics consistent with implementations of the current subject matter can therefore be extremely relevant to sales as well as to other business-related activities supported by a business software architecture.

Feed data in a business software environment can typically contain highly contextualized business data. Feed content items can have business objects attached thereto. As such, consistent with implementations of the current subject matter, weights can be accurately assigned to the feed data based on business use contexts (e.g. as can be derived from metadata in a business object or other data structure) for the purposes of analyzing trends using the one or more trending algorithms. This approach can yield superior results relative to a search trend analysis in which the trending metric is based on a mere text analysis. As an illustrative example, an organization using feeds or other features similar to those discussed herein can have a very high value customer called ABC, Inc. If a feed item is created with a reference to ABC, Inc. it can have increased weighting in trending algorithm calculation than another less high valued customer or just a plain text feed item. The additional weighting can be based on one or more metadata items, which can optionally include total sales to the specific customer, a designation as a key customer, etc.

Figure 2:
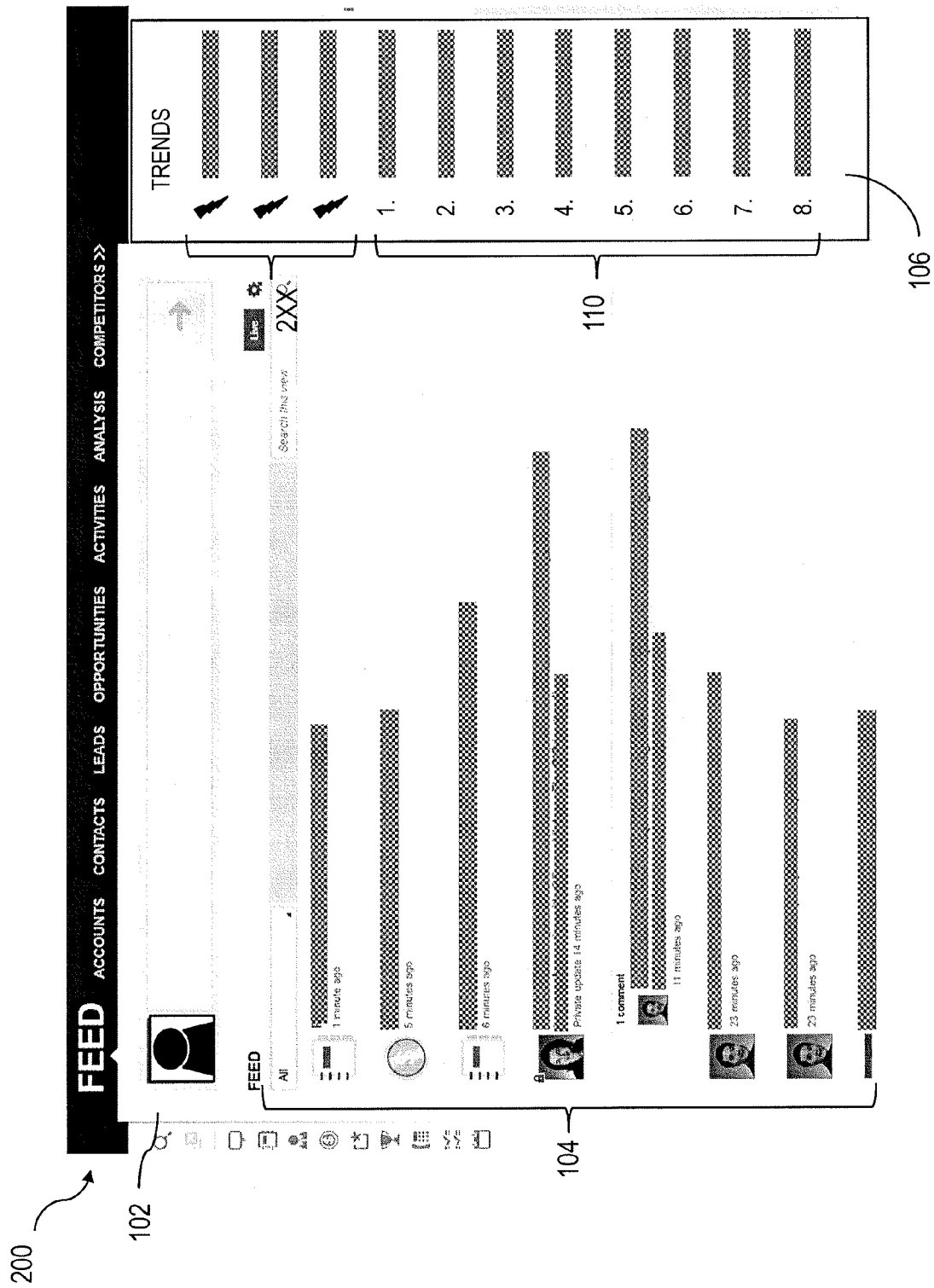
FIG. 2 is a screenshot of a sales flow automation application showing a new feeds panel and a trends panel including artificially generated trends.

Some implementations of the current subject matter provide additional features relating to allowing a business user in a management, supervisory, administrative, or other "super user" role within the customer organization to influence the trends to thereby align users within the organization with organizational goals and objectives. This mechanism can enable decision-makers in the organization to designate or otherwise influence certain "artificial trend items" that can be highlighted in the trends window 106 displayed to a business user. FIG. 2 shows a screenshot illustrating a second view 200 of a user interface of a business software architecture. In the example of FIG. 2, the business software architecture includes a sales performance application. As in FIG. 1, a feed window 102 can display a dynamically updated personal feed content stream, and a trends window 106 can display information about trending topics based on analysis of feed content items currently being generated with a pool of content generators. The trends window 106 can optionally, in addition to the list of trending topics 110 generated by one or more trending algorithms, also include one or more artificial trend items 202 that can be displayed in a prominent manner in the trends window 106 such that the one or more artificial trend items 202 are visually distinguishable from the trending topics in the list of trending topics 110. For example, the one or more artificial trend items 202 can be displayed at a top part of the trends window, in a different font or format than the entries in the list of trending topics 110, associated with a special icon or other graphic, or the like.

Artificial trend items 202 can be created specifically for entry into the trends window to be highlighted or emphasized as discussed above. For example, a super-user or the like can create an artificial trend item relating to an upcoming a sales meeting, and this artificial trend item can be included in the trends window 106 independently of whether a similar trending topic exists or does not exist based on the one or more trending algorithms. Alternatively, a super-user or the like can define one or more parameters of an artificial trend such that a trending topic identified by the trending algorithm and also matching the one or more parameters is not displayed in the list of trending topics 110 but is instead subsumed within the artificial trend item 202. In a further example, an icon associated with an artificial trend item 202 can include user input functionality to allow a business user to expand the artificial trend item 202 and thereby show one or more trend topics that have been subsumed within the artificial trend item 202 as described above. In another example, a super-user or the like can manually adjust a score or other metric associated with a trending topic generated by the one or more trending algorithms. The adjustment of the score or other metric can optionally either affect the ranking of that trend topic within the list of trending topics 110, cause the trend topic to be displayed in the same manner as an artificial trend item 202 as discussed above, or completely removed from the trends window 106 (e.g. if the super-user of to like wishes to eliminate that trend topic for some reason).

Creation of artificial trend items in this manner can be useful in driving or influencing business users towards certain trends that are considered to be in line with goals of the customer organizational. In contrast to a public social media platforms such as those discussed above, the current subject matter provides a forum for conveying data that is relevant for carrying out business goals rater than an open or public forum for uninfluenced information exchange.

Figure 4:
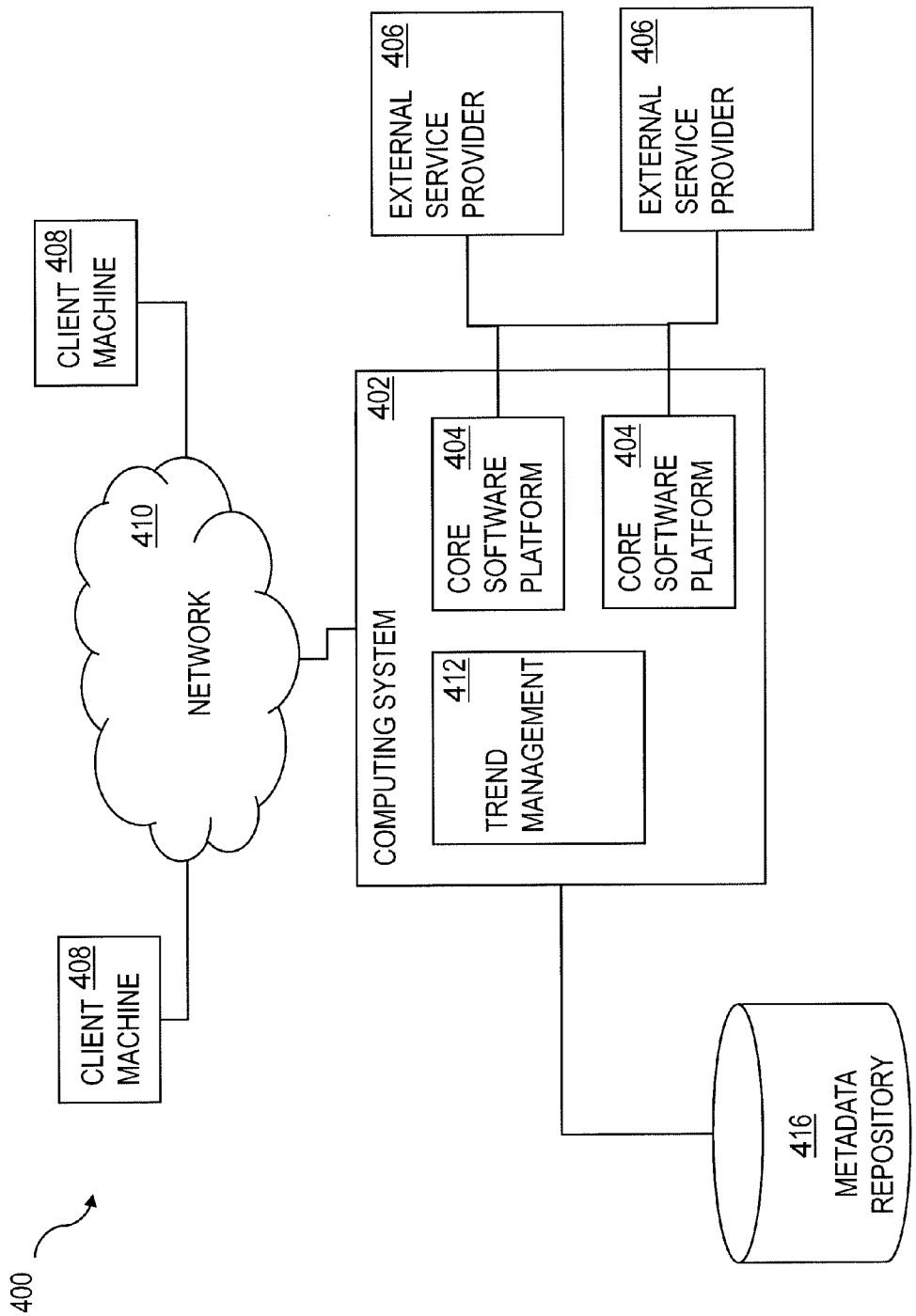
FIG. 4 is a diagram illustrating aspects of a system showing features consistent with implementations of the current subject matter.

The core software platform of a business software architecture, or the like can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 4 shows a diagram of a system consistent with such an implementation. A computing system 402 can include one or more core software platform modules 404 providing one or more features of the business software system. The computing system can also aggregate or otherwise provide a gateway via which business users can access functionality provided by one or more external service providers 406. Client machines 408 can access the computing system, either via a direct connection, a local terminal, or over a network 410 (e.g. a local area network, a wide area network, a wireless network, the Internet, or the like). A trend management module or other comparable functionality 412 can be hosted on the computing system 402 or alternatively, on an external system accessible over a network connection. The trend management module or other comparable functionality 412 can optionally include one or more discrete software and/or hardware modules that perform operations such as those described herein.

Figure 3:
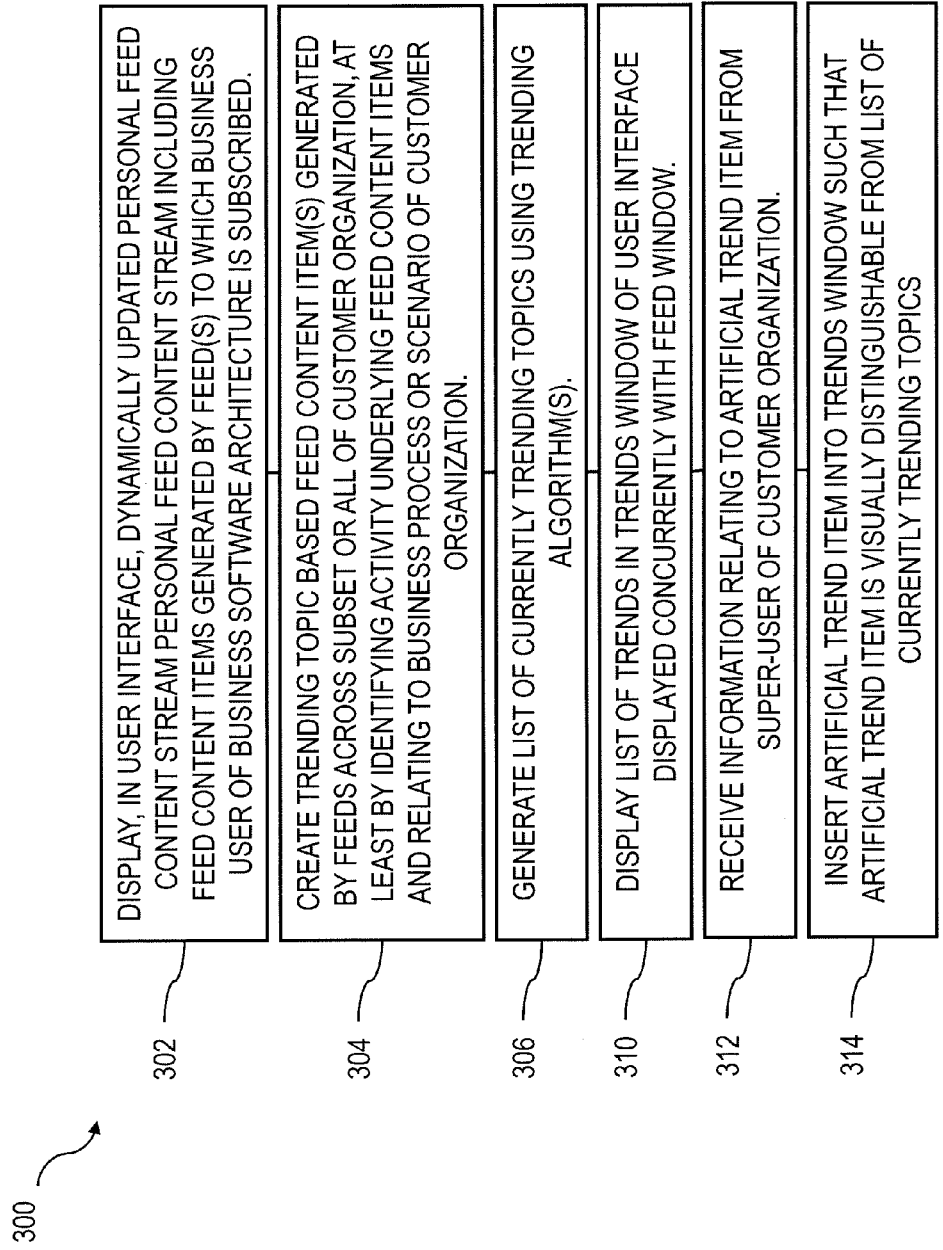
FIG. 3 is a process flow diagram showing aspects of a method having one or more features consistent with implementations of the current subject matter.

FIG. 3 shows a process flow chart 300 that illustrates features of a method. One or more of these features can be present in various implementations of the current subject matter. At 302, a dynamically updated personal feed content stream is displayed in a feed window of a user interface of a business software architecture. The personal feed content stream includes feed content items generated by one or more feeds to which a business user of the business software architecture is subscribed. At 304, a trending topic based on one or more of a plurality of feed content items generated by a plurality of feeds across at least a subset of a customer organization using the business software architecture is created, at least in part by identifying an activity underlying the one or more of the plurality of feed content items. The activity relates to a business process or scenario of the customer organization. At 306, a list of currently trending topics, which includes the trending topic, is generated using one or more trending algorithms. At 310, the list of trends is displayed in a trends window of the user interface that is displayed concurrently with the feed window. In a further optional feature, information relating to an artificial trend item can be received from a super-user of the customer organization at 312, and at 314 the artificial trend item is inserted into the trends window such that the artificial trend item is visually distinguishable from the list of currently trending topics.

The trend management module or other comparable functionality 412 can access one or more metadata repositories and/or other data repositories 416 (e.g. process repositories, scenarios repositories, transactional data repositories, etc.) that can store definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. In some examples, the definition can optionally be stored as a business object. In some implementations, the business object can store a business object that represents a template definition of a standard business process or that other underlies a sales opportunity, business project, or the like. The template definition that can optionally be modified via one or more extensions that are stored in the one or more metadata repositories 416.

Smaller organizations can also benefit from use of business software functionality. However, such an organization may lack the necessary hardware resources, IT support, and/or consulting budget necessary to make use of a standalone business software software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of a business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 5:
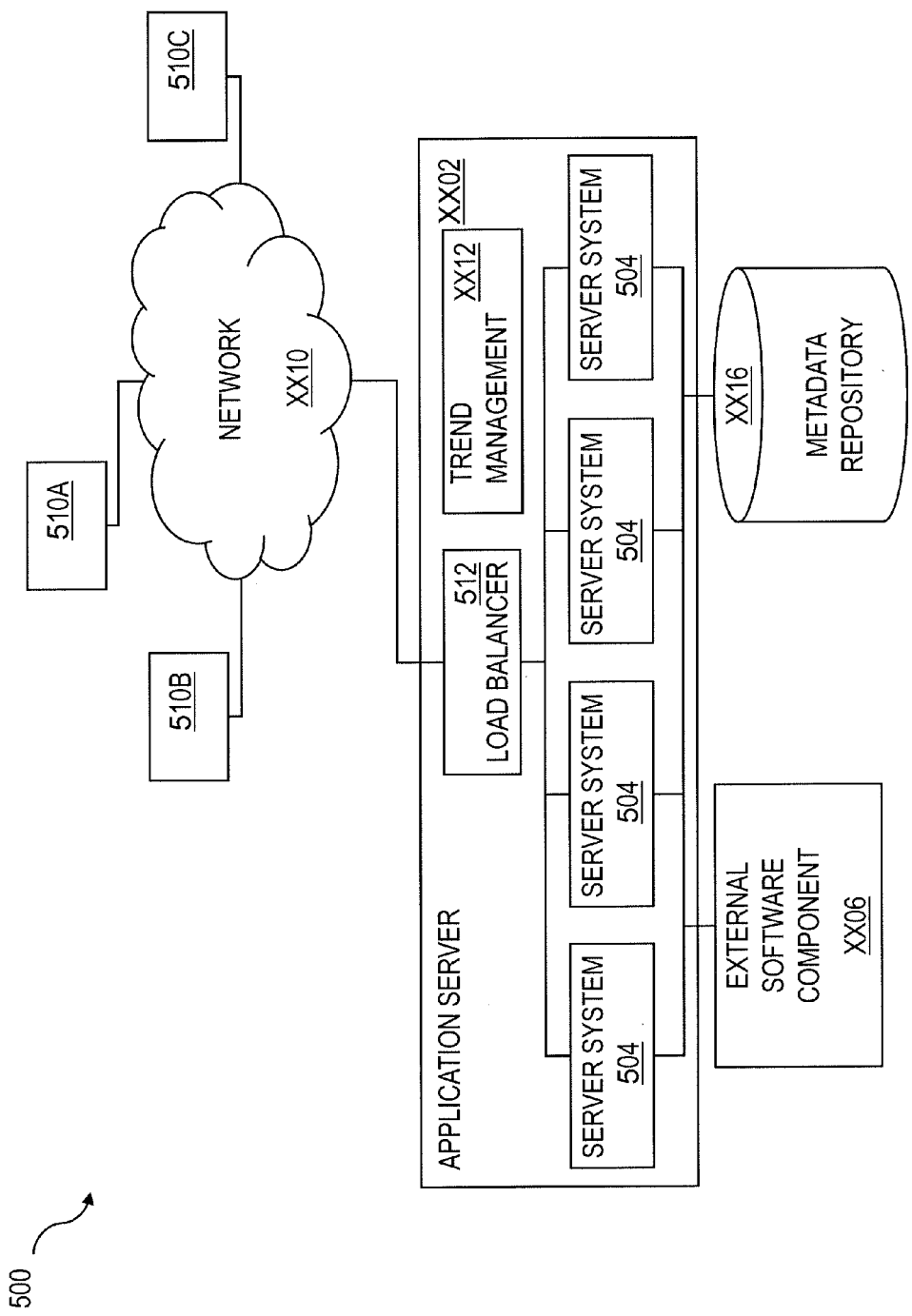
FIG. 5 is a diagram illustrating aspects of another system showing features consistent with implementations of the current subject matter.

FIG. 5 shows a block diagram of a multi-tenant implementation of a software delivery architecture 500 that includes an application server 502, which can in some implementations include multiple server systems 504 that are accessible over a network 506 from client machines operated by users at each of multiple organizations 510A-510C (referred to herein as "tenants" of a multi-tenant system) supported by a single software delivery architecture 500. For a system in which the application server 502 includes multiple server systems 504, the application server can include a load balancer 512 to distribute requests and actions from users at the one or more organizations 510A-510C to the one or more server systems 504. Instances of the core software platform 404 (not shown in FIG. 5) can be executed in a distributed manner across the server systems 504. A user can access the software delivery architecture across the network using a thin client, such as for example a web browser or the like, or other portal software running on a client machine. The application server 502 can access data and data objects stored in one or more data repositories 416. The application server 502 can also serve as a middleware component via which access is provided to one or more external software components 406 that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 502 that includes multiple server systems 504 that handle processing loads distributed by a load balancer 512. Potential benefits from such an arrangement can include, but are not limited to, high and reliably continuous application server availability and minimization of unplanned downtime, phased updating of the multiple server systems 504 to permit continuous availability (one server system 504 can be taken offline while the other systems continue to provide services via the load balancer 512), scalability via addition or removal of a server system 504 that is accessed via the load balancer 512, and de-coupled lifecycle processes (such as for example system maintenance, software upgrades, etc.) that enable updating of the core software independently of tenant-specific customizations implemented by individual tenants.

As in the example illustrated in FIG. 4, the metadata repository 416 can store a business object that represents a template definition of a standard business process or that other underlies a sales opportunity, business project, or the like. Each individual tenant 510A-510C can customize that standard template according to the individual business process features specific to business of the organization to which that tenant is assigned. Customizations can be stored as extensions in the metadata repository.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory computer-readable storage medium storing one or more programs, the one or more programs comprising instructions that, when executed by at least one programmable processor, cause the at least one programmable processor to perform operations comprising:

displaying, in a feed window of a user interface of a business software architecture, a dynamically updated personal feed content stream, the personal feed content stream comprising feed content items generated by one or more feeds to which a business user of the business software architecture is subscribed;

creating a trending topic based on one or more of a plurality of feed content items generated by a plurality of feeds across at least a subset of a customer organization using the business software architecture, the creating comprising identifying an activity underlying the one or more of the plurality of feed content items, the activity relating to a business process or scenario of the customer organization;

generating, using one or more trending algorithms, a list of currently trending topics, the list comprising the trending topic; and displaying the list of trends in a trends window of the user interface that is displayed concurrently with the feed window.

2. The computer program product as in claim 1, wherein the operations further comprise:

receiving, from a super-user of the customer organization, information relating to an artificial trend item; and inserting the artificial trend item into the trends window such that the artificial trend item is visually distinguishable from the list of currently trending topics, wherein the artificial trend item is inserted into the trends window independently of whether a similar trending topic exists or does not exist based on the one or more trending algorithms.

3. The computer program product as in claim 2, wherein the operations further comprise subsuming the trending topic within the artificial trend item when the trending topic is similar to the artificial trend item.

4. The computer program product as in claim 1, wherein the business software architecture comprises a sales force automation solution.

5. The computer program product as in claim 1, wherein the generating of the list of currently trending topics further comprises:

accessing, by the one or more trending algorithms, a meta-model of a business process or a business scenario relating to the activity underlying the one or more of the plurality of feed content items, determining, from the meta-model, a definition of at least one business process or scenario relevant to the customer organization; and applying the definition as a further metric in the trending algorithm to generate the list.

6. The computer program product as in claim 1, wherein the generating of the list of currently trending topics further comprises:

accessing, by the one or more trending algorithms, a meta-model of a business object representing an entity relevant to the business process or business scenario, the business object generating a feed content item of the plurality of feed content items; and applying, a weighting factor to the feed content item, the weighting factor indicating a level of relevance of the entity to the business process of business scenario extracted from the meta-model of the business object.

7. The computer program product as in claim 1, wherein the creating further comprises assigning a weight to at least some of the plurality of feed content items, the weight being based on a business use context of a business object that generates the at least some of the plurality of feed content items.

8. The computer program product as in claim 1, wherein the trending topic is created when the topic is highly active across at least the subset of the customer organization using the business software architecture.

9. A system comprising:

at least one programmable processor; and a machine-readable medium storing instructions that, when executed by the at least one processor, cause the at least one programmable processor to perform operations comprising:

displaying, in a feed window of a user interface of a business software architecture, a dynamically updated personal feed content stream, the personal feed content stream comprising feed content items generated by one or more feeds to which a business user of the business software architecture is subscribed;

creating a trending topic based on one or more of a plurality of feed content items generated by a plurality of feeds across at least a subset of a customer organization using the business software architecture, the creating comprising identifying an activity underlying the one or more of the plurality of feed content items, the activity relating to a business process or scenario of the customer organization;

generating, using one or more trending algorithms, a list of currently trending topics, the list comprising the trending topic; and displaying the list of trends in a trends window of the user interface that is displayed concurrently with the feed window.

10. The system as in claim 9, wherein the operations further comprise:

receiving, from a super-user of the customer organization, information relating to an artificial trend item; and inserting the artificial trend item into the trends window such that the artificial trend item is visually distinguishable from the list of currently trending topics, wherein the artificial trend item is inserted into the trends window independently of whether a similar trending topic exists or does not exist based on the one or more trending algorithms.

11. The system as in claim 9, wherein the business software architecture comprises a sales force automation solution.

12. The system as in claim 9, wherein the generating of the list of currently trending topics further comprises:

accessing, by the one or more trending algorithms, a meta-model of a business process or a business scenario relating to the activity underlying the one or more of the plurality of feed content items, determining, from the meta-model, a definition of at least one business process or scenario relevant to the customer organization; and applying the definition as a further metric in the trending algorithm to generate the list.

13. The system as in claim 9, wherein the generating of the list of currently trending topics further comprises:

accessing, by the one or more trending algorithms, a meta-model of a business object representing an entity relevant to the business process or business scenario, the business object generating a feed content item of the plurality of feed content items; and applying a weighting factor to the feed content item, the weighting factor indicating a level of relevance of the entity to the business process of business scenario extracted from the meta-model of the business object.

14. The system as in claim 9, wherein the creating further comprises assigning a weight to at least some of the plurality of feed content items, the weight being based on a business use context of a business object that generates the at least some of the plurality of feed content items.

15. A computer-implemented method comprising:

displaying, in a feed window of a user interface of a business software architecture, a dynamically updated personal feed content stream, the personal feed content stream comprising feed content items generated by one or more feeds to which a business user of the business software architecture is subscribed;

creating a trending topic based on one or more of a plurality of feed content items generated by a plurality of feeds across at least a subset of a customer organization using the business software architecture, the creating comprising identifying an activity underlying the one or more of the plurality of feed content items, the activity relating to a business process or scenario of the customer organization;

generating, using one or more trending algorithms, a list of currently trending topics, the list comprising the trending topic;

displaying the list of trends in a trends window of the user interface that is displayed concurrently with the feed window; and wherein at least one of the displaying of the dynamically updated personal feed content stream, the creating, the generating, and the displaying of the list of trends is performed by a system comprising at least one programmable processor.

16. The computer-implemented method as in claim 15, wherein the operations further comprise:

receiving, from a super-user of the customer organization, information relating to an artificial trend item; and inserting the artificial trend item into the trends window such that the artificial trend item is visually distinguishable from the list of currently trending topics, wherein the artificial trend item is inserted into the trends window independently of whether a similar trending topic exists or does not exist based on the one or more trending algorithms.

17. The computer-implemented method as in claim 15, wherein the business software architecture comprises a sales force automation solution.

18. The computer-implemented method as in claim 15, wherein the generating of the list of currently trending topics further comprises:

accessing, by the one or more trending algorithms, a meta-model of a business process or a business scenario relating to the activity underlying the one or more of the plurality of feed content items, determining, from the meta-model, a definition of at least one business process or scenario relevant to the customer organization; and applying the definition as a further metric in the trending algorithm to generate the list.

19. The computer-implemented method as in claim 15, wherein the generating of the list of currently trending topics further comprises:

accessing, by the one or more trending algorithms, a meta-model of a business object representing an entity relevant to the business process or business scenario, the business object generating a feed content item of the plurality of feed content items; and applying a weighting factor to the feed content item, the weighting factor indicating a level of relevance of the entity to the business process of business scenario extracted from the meta-model of the business object.

20. The computer-implemented method as in claim 15, wherein the creating further comprises assigning a weight to at least some of the plurality of feed content items, the weight being based on a business use context of a business object that generates the at least some of the plurality of feed content items.

* * * * *